(12) United States Patent
Lu et al.

(10) Patent No.: US 11,273,889 B2
(45) Date of Patent: Mar. 15, 2022

(54) SELF-RIGHTING UNMANNED VEHICLE

(71) Applicant: POWERVISION TECH INC., Beijing (CN)

(72) Inventors: Zhihong Lu, Beijing (CN); Yang Liu, Beijing (CN); Guangzhang Wu, Beijing (CN); Xianpeng Zhao, Beijing (CN)

(73) Assignee: POWERVISION TECH INC., Beijing (CN)

( * ) Notice: Subject to any disclaimer, the term of this patent is extended or adjusted under 35 U.S.C. 154(b) by 31 days.

(21) Appl. No.: 16/920,663

(22) Filed: Jul. 4, 2020

(65) Prior Publication Data

US 2020/0339232 A1 Oct. 29, 2020

Related U.S. Application Data

(63) Continuation of application No. PCT/CN2019/070519, filed on Jan. 5, 2019.

(30) Foreign Application Priority Data

Jan. 5, 2018 (CN) .......................... 201810013595.2

(51) Int. Cl.
*B63B 39/08* (2006.01)
*B63B 79/10* (2020.01)
(Continued)

(52) U.S. Cl.
CPC .............. *B63B 39/08* (2013.01); *B63B 35/00* (2013.01); *B63B 43/04* (2013.01); *B63B 79/10* (2020.01);
(Continued)

(58) Field of Classification Search
CPC ......... B63B 39/00; B63B 39/08; B63B 79/00; B63B 79/10; B63B 43/00; B63B 43/04;
(Continued)

(56) References Cited

U.S. PATENT DOCUMENTS 6,926,566 B2 * 8/2005 Atmur .................... B63G 8/001
440/38
8,543,256 B1 * 9/2013 Karafiath .................. B60F 3/00
114/344
(Continued)

FOREIGN PATENT DOCUMENTS

CN 101214847 A 7/2008
CN 107187560 A 9/2017
(Continued)

*Primary Examiner* — Lars A Olson
(74) *Attorney, Agent, or Firm* — Tianchen LLC.; Yuan R. Li; Yi Fan Yin

(57) ABSTRACT

A self-righting unmanned vehicle, comprising: a cavity 1, located at a first side of the hull of the unmanned vehicle; a sealed cavity 2, located at a second side of the hull of the unmanned vehicle and provided, in parallel to the cavity 1, in a head region of the hull; and a first propeller 3, provided in a tail intersection region of a normal waterline A with an inversion waterline B of the unmanned vehicle, and rotating in a reverse direction when the unmanned vehicle is in an overturned state. The self-righting unmanned vehicle improves the self-righting efficiency of the unmanned vehicle.

14 Claims, 3 Drawing Sheets

(51) Int. Cl.
*B63B 43/04* (2006.01)
*G05D 1/02* (2020.01)
*B63B 35/00* (2020.01)

(52) U.S. Cl.
CPC ...... *G05D 1/0206* (2013.01); *B63B 2035/006* (2013.01)

(58) Field of Classification Search
CPC ............. B63B 2035/006; B63B 35/00; G05D 1/0206; B63G 8/00; B63G 8/001; B63H 5/00; B63H 5/15; B63H 21/00; B63H 21/17
USPC ...................................................... 114/144 R
See application file for complete search history.

(56) References Cited

U.S. PATENT DOCUMENTS

| | | | |
|---|---|---|---|
| 9,227,709 B1 | 1/2016 | Schill et al. | |
| 10,011,337 B2 * | 7/2018 | MacCready | ............. B63G 8/26 |

FOREIGN PATENT DOCUMENTS

| | | | |
|---|---|---|---|
| CN | 106628026 A | 10/2017 | |
| CN | 107264718 A | 10/2017 | |

* cited by examiner

SELF-RIGHTING UNMANNED VEHICLE

CROSS-REFERENCE TO RELATED APPLICATIONS

This is a continuing application, under 35 U.S.C. § 120, of copending international application No. PCT/CN2019/070519, filed Jan. 5, 2019, which designated the United States; this application also claims the priority, under 35 U.S.C. § 119, of Chinese patent applications No. 201810013595.2, filed Jan. 5, 2018 and the invention title "Self-Righting Unmanned Vehicle"; the prior applications are herewith incorporated by reference in their entirety.

TECHNICAL FIELD

The present application relates to the technical field of unmanned vehicle, and more specifically, to a self-righting unmanned vehicle.

BACKGROUND

Robot technology has developed rapidly in recent years. A large number of unmanned devices, such as unmanned aerial vehicles, unmanned cars and unmanned vehicles, which are adapted for use in different environments, have not yet been widely applied for civil use due to technical and other restrictions. By taking unmanned vehicles as an example, most of the existing unmanned vehicles are used for military purposes to complete, for example, investigation tasks, remote attack tasks and so on. Also, some are applied in scientific research, such as ocean data monitoring, experimental sample collection and so on. Industrially, some are used for remote maintenance of certain underwater equipment, industrial exploitation and so on. Their civil applications still remain limited. Currently, in addition to those unmanned vehicles for entertainment purposes, unmanned vehicles for actual work are demanded increasingly in the civil market, therefore, the requirements for unmanned vehicles become higher and higher.

In the process of its actual work, an unmanned vehicle may often capsize (i.e. the unmanned vehicle is in an overturned state) due to the working environment (e.g., strong wind and waves), the overspeed when the unmanned vehicle is turning or other reasons. If the unmanned vehicle is righted manually (by adjusting the unmanned vehicle from the overturned state to the normal state), much time and effort will be invested to do so. Furthermore, when a propeller keeps working for a long time in the case of capsizing, this will result in the waste of the energy of the unmanned vehicle; and on the other hand, damage is also caused to the propeller motor by the prolonged idling of the propeller.

Hence, there is an urgent necessity for a solution concerning a novel self-righting unmanned vehicle simple in structure, easy in maintenance and great in reliability.

SUMMARY OF THE INVENTION

In view of this, the present application provides in the embodiments a self-righting unmanned vehicle and a submersible, which at least partially solves the problem existing in the prior art.

The present application provides in the embodiments a self-righting unmanned vehicle, comprising:

a cavity, located at a first side of the hull of the unmanned vehicle;

a sealed cavity, located at a second side of the hull of the unmanned vehicle and provided, in parallel to the cavity, in a head region of the hull; and a first propeller, provided in a tail intersection region of a normal waterline with an inversion waterline of the unmanned vehicle, and rotating in a reverse direction when the unmanned vehicle is in an overturned state.

According to one specific mode of implementation of the embodiments of the present application, the first propeller is located at the first side of the hull.

According to one specific mode of implementation of the embodiments of the present application, the self-righting unmanned vehicle further comprises:

a second propeller, located at the second side of the hull.

According to one specific mode of implementation of the embodiments of the present application, the self-righting unmanned vehicle further comprises:

a buoyancy accessory, provided at the second side of the hull.

According to one specific mode of implementation of the embodiments of the present application, the first propeller comprises a screw propeller and a first channel in cooperation with the first screw propeller.

According to one specific mode of implementation of the embodiments of the present application, the first propeller further comprises a screw propeller shield, an tail end of the first channel being connected with the screw propeller shield.

According to one specific mode of implementation of the embodiments of the present application, the first channel and a rotation plane of the first screw propeller form a preset angle.

According to one specific mode of implementation of the embodiments of the present application, the preset angle ranges from 30 to 60 degrees.

According to one specific mode of implementation of the embodiments of the present application, the self-righting unmanned vehicle further comprises:

a sensing device, detecting whether the unmanned vehicle is in the overturned state.

According to one specific mode of implementation of the embodiments of the present application, the self-righting unmanned vehicle further comprises:

a control device, controlling the first screw propeller to reverse-rotate when the unmanned vehicle is in the overturned state.

According to one specific mode of implementation of the embodiments of the present application, the sensing device is further used to detect whether the second propeller is above the water surface.

According to one specific mode of implementation of the embodiments of the present application, the control device controls the second propeller to stop rotating when the second propeller is above the water surface.

According to one specific mode of implementation of the embodiments of the present application, the second propeller stops rotating when the unmanned vehicle is in the overturned state.

According to one specific mode of implementation of the embodiments of the present application, the control device transmits to an unmanned vehicle controller information about the overturning of the unmanned vehicle detected by the sensing device.

According to one specific mode of implementation of the embodiments of the present application, the control device receives propeller control instructions transmitted by the unmanned vehicle controller and controls, based on the control instructions, operation of the first and second propellers.

The present application provides in the embodiments a self-righting unmanned vehicle, comprising: a hull; and a first propeller, provided in a tail intersection region of a normal waterline with an inversion waterline of the hull of the unmanned vehicle, and configured to rotate in a forward direction and then rotate in a reverse direction when the unmanned vehicle is in an overturned state.

According to one specific mode of implementation of the embodiments of the present application, the self-righting unmanned vehicle further comprises a cavity, located at a first side of the hull of the unmanned vehicle, wherein the first propeller is located at the first side of the hull.

According to one specific mode of implementation of the embodiments of the present application, the self-righting unmanned vehicle further comprises a sealed cavity, located at a second side of the hull of the unmanned vehicle, the cavity and the sealed cavity are provided in a head region of the hull.

According to one specific mode of implementation of the embodiments of the present application, the self-righting unmanned vehicle further comprises: a second propeller, located at the second side of the hull; and a buoyancy accessory, provided at the second side of the hull.

According to one specific mode of implementation of the embodiments of the present application, the self-righting unmanned vehicle further comprises: a sensing device configured to detect whether the unmanned vehicle is in the overturned state; and a control device, communicating with the sensing device and configured to control the first propeller to rotate in a forward direction for a predetermined time and then rotate in a reverse direction when the unmanned vehicle is in an overturned state, until the unmanned vehicle is turned over.

According to one specific mode of implementation of the embodiments of the present application, the second propeller is configured to stop rotating when the second propeller is above the water surface.

The present application provides in the embodiments a method for controlling an unmanned vehicle, the unmanned vehicle comprising a hull and a first propeller provided in a tail intersection region of a normal waterline with an inversion waterline of the hull of the unmanned vehicle, the method comprising: detecting whether the unmanned vehicle is in an overturned state; and controlling the first propeller to rotate in a forward direction and then rotate in a reverse direction when the unmanned vehicle is in an overturned state, until the unmanned vehicle is turned over.

In regard to the self-righting unmanned vehicle provided in the embodiments of the present application, the cavity and the sealed cavity are arranged at the both sides of the unmanned vehicle, respectively, such that water entering the cavity can be used to enable the unmanned vehicle, when capsized, to be in an inclined state of sinking at the first side while rising at the second side; and the first propeller provided at the tail intersection region of the normal waterline with the inversion waterline of the unmanned vehicle is used to perform a reverse rotation operation, such that the unmanned vehicle can quickly perform a self-righting operation.

BRIEF DESCRIPTION OF THE DRAWINGS

In order to explain the technical solution of the embodiments of the present application more clearly, brief introduction will be made below to the drawings needed for the examples. Obviously, the drawings described below only represent some examples of the present application. According to these drawings, those skilled in the art can further obtain other drawings without any creative labor.

DETAILED DESCRIPTION

Detailed description of the examples of the present application will be made below with reference to the drawings.

It should be clear that the examples described herein are not all, but only some, of the examples of the present application. Based on the examples set forth in the present application, all other examples obtained by those skilled in the art without any creative labor should fall into the protection scope of the present application.

In the course of its actual operation, an unmanned vehicle may often capsize (i.e. the unmanned vehicle is in an overturned state) due to the operating environment (e.g., strong wind and waves), the overspeed when the unmanned vehicle is turning, or other reasons. If the unmanned vehicle is righted manually (by adjusting the unmanned vehicle from the overturned state to the normal state), much time and effort will be invested to do so. Furthermore, when a propeller keeps working for a long time in the case of capsizing, this will result in the waste of the energy of the unmanned vehicle; and on the other hand, damage is also caused to the propeller motor by the prolonged idling of the propeller. In this regard, it is necessary to provide a novel solution concerning the self-righting of an unmanned vehicle.

Figure 1:
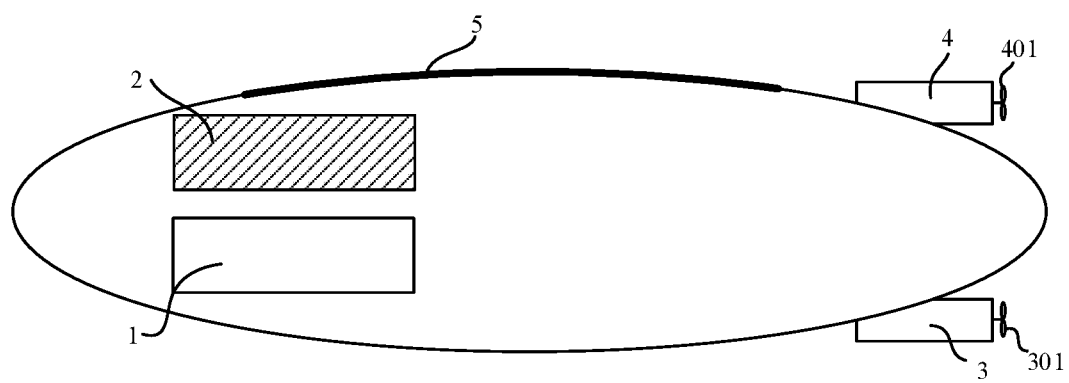
FIG. 1 is a structural diagram of a self-righting unmanned vehicle, viewed from the top, provided by one embodiment of the present application.

With reference to FIG. 1, one example of the present application provides a self-righting unmanned vehicle, comprising: a cavity 1, a sealed cavity 2 and a first propeller 3.

The cavity 1 is an open space. When the unmanned vehicle is cruising normally, filled within the cavity is air; and when the unmanned vehicle is in an overturned state, the cavity will be below the water surface, and then water will gradually flow into the cavity 1. Because the cavity 1 is located at one side of the hull of the unmanned vehicle, and because water by then flows into the cavity 1 at the side of the cavity 1, the side provided with the cavity 1 of the unmanned vehicle will sink, while the other side opposite the cavity 1 will rise.

The sealed cavity 2 is an airtight component. Optionally, the sealed cavity can be filled with closed air, or a small number of components (e.g. a control circuit board for the unmanned vehicle) can be equipped in the sealed cavity. The sealed cavity 2 is located at a second side of the hull of the unmanned vehicle, and provided, in parallel to the cavity 1, in a head region of the hull. When the unmanned vehicle is in the overturned state, the sealed cavity will be below the water surface. Because the overall density of the sealed cavity 2 is lower than that of water, the sealed cavity 2 by then provides the unmanned vehicle with buoyancy at the second side, which further makes the first side of the unmanned vehicle remain in a sinking state and the second side of the unmanned vehicle in a rising state.

Figure 2:
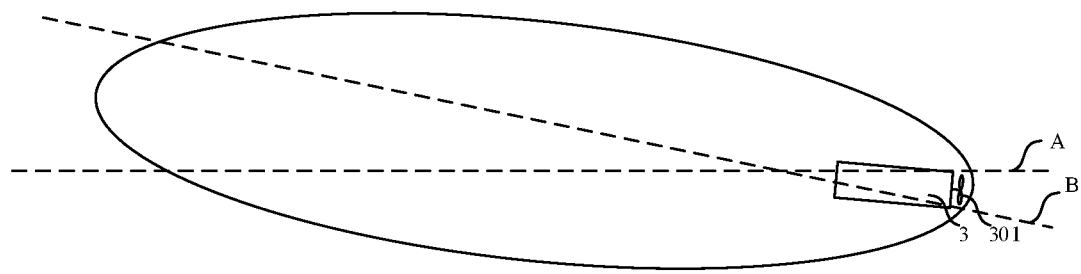
FIG. 2 is a schematic diagram of the installation position of the first propeller in the unmanned vehicle provided by one embodiment of the present application.

The arrangement of the cavity 1 and the sealed cavity 2 can make the first side of the unmanned vehicle remain in the sinking state, the second side of the unmanned vehicle in the rising state, which does not allow rapid self-righting of the unmanned vehicle. By then, the first propeller 3 on the unmanned vehicle can be utilized. As shown in FIGS. 1-2, the first propeller 3 and a second propeller 4 are provided at the first side and the second side of the unmanned vehicle, respectively. In order to improve the efficiency of the first propeller 3 and the second propeller 4, the unmanned vehicle is designed with a lighter head and a heavier tail, such that a normal waterline A of the unmanned vehicle in the normal state (i.e. a contact line between the hull and the water surface when the unmanned vehicle is in the normal state) and an inversion waterline of the unmanned vehicle in the overturned state (i.e. a contact line between the hull and the water surface when the unmanned vehicle is in the overturned state) form an intersection region at the tail; and the first propeller 3 is provided in the intersection region, which can ensure that the first propeller 3 can remain below the water surface, no matter whether in the normal state or the overturned state, and provide power for the unmanned vehicle. In addition, the second propeller 4 also can be provided in the intersection region.

In order to accelerate the self-righting operation of the unmanned vehicle in the overturned state, the first propeller 3 rotates in a reverse direction when the unmanned vehicle is in the overturned state. Specifically, a screw propeller 301 in the propeller 3 can be controlled to rotate in a reverse direction in water to provide an acting force for the self-righting of the unmanned vehicle.

In addition to the first propeller 3, the self-righting unmanned vehicle also comprises a second propeller 4 located at the second side of the hull. When the unmanned vehicle is in the normal state, the second propeller 4 provides the unmanned vehicle with a driving force for advancement; and when the unmanned vehicle is in the overturned state, because the unmanned vehicle sinks at the first side and rises upward at the second side, the second propeller 4 located at the second side by then may be above the water surface (i.e. the second propeller 4 does not contact the water surface).

In addition to the design of the cavity 1 and the sealed cavity 2, in order to accelerate the self-righting operation of the unmanned vehicle in the overturned state, according to one specific mode of implementation of the examples of the present application, the self-righting unmanned vehicle further comprises a buoyancy accessory 5 provided at the second side of the hull. The buoyancy accessory 5 can be made of a buoyancy material having a density smaller than water (e.g., polyethylene foam), and arranged above the normal waterline A, such that when the unmanned vehicle is in the overturned state, the buoyancy accessory 5 is below the water surface, and the buoyancy accessory 5 and the sealed cavity 2 together provide a force for buoyance and self-righting of the unmanned vehicle at the second side.

Figure 3:
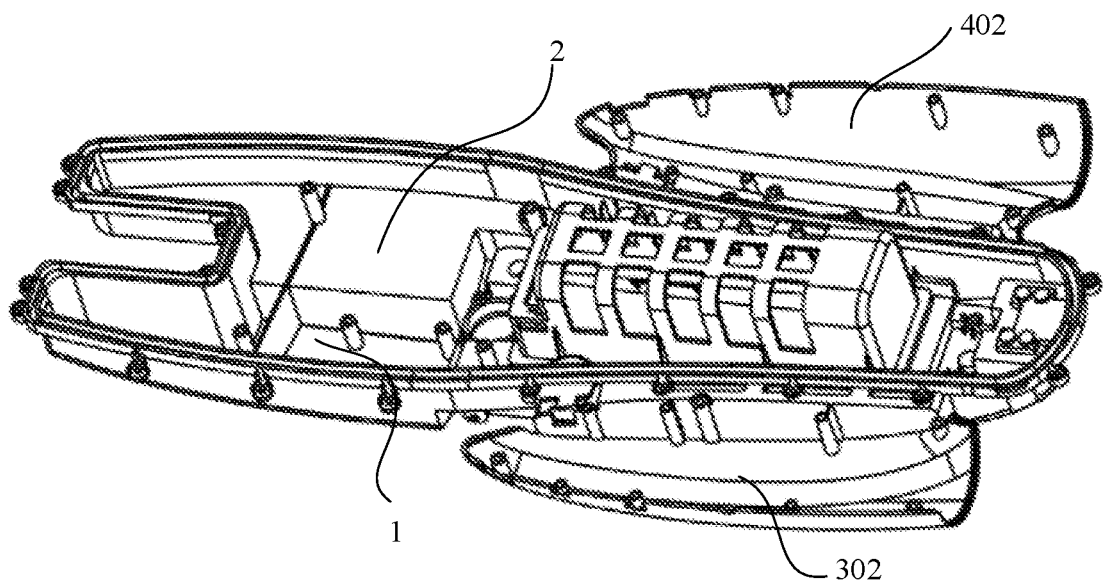
FIG. 3 is a structural diagram of the hull of the unmanned vehicle provided by one embodiment of the present application.

FIG. 3 provides a structural diagram of the hull of the unmanned vehicle. As shown in FIG. 3, the cavity 1 and the sealed cavity 2 can be formed at the head of the hull of the unmanned vehicle by means of integrated molding (e.g., injection molding). In addition, a first propeller bottom shell 302 and a second propeller bottom shell 402 can be further provided, and the first propeller bottom shell 302 and the second propeller bottom shell 402 are fixed with the hull of the unmanned vehicle, respectively. A propeller motor and other propeller components can be installed in the first propeller bottom shell 302 and the second propeller bottom shell 402.

Figure 4:
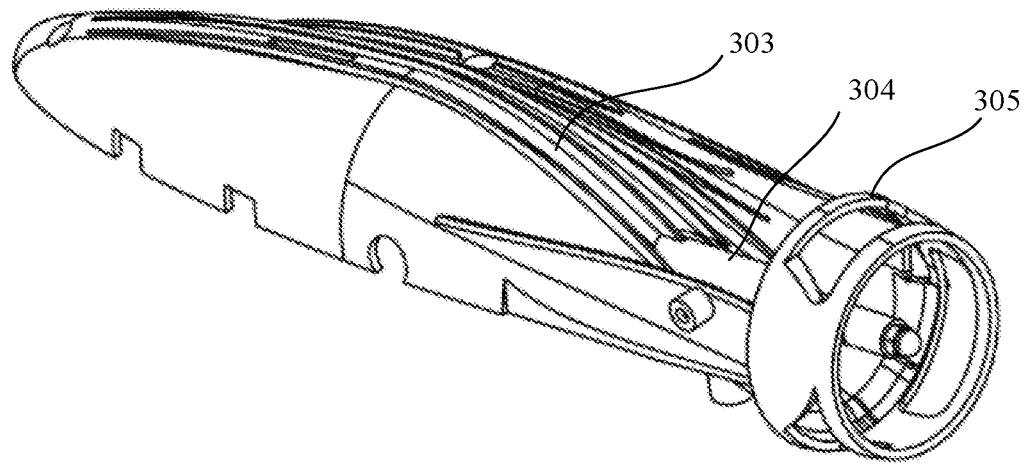
FIG. 4 is a structural diagram of the first propeller provided by one embodiment of the present application.

Since the power device (e.g. a motor) of the propeller is usually installed in front of the screw propeller of the propeller, when the screw propeller performs a reversal rotation, the motor and other components in front of the screw propeller will block the water flow generated when the screw propeller is performing the reversal rotation, thereby affecting the efficiency of the reversal rotation of the propeller. As shown in FIG. 4, according to one specific mode of implementation of the examples of the present application, the first propeller 3 comprises a first screw propeller 301 and a first channel 303 in cooperation with the first screw propeller 301. The first channel 303 is a curved surface having a certain degree of curvature. In order to improve the efficiency of the first channel 303, a tail end of the first channel 303 is connected with a screw propeller shield 305 of the first propeller 3, and a starting end of the first channel 303 is connected with an outer surface of the head of the first propeller 3, such that when the first screw propeller 301 is operating in a reverse direction, the reverse water flow generated by the same will be smoothly discharged out along the first channel 303, thereby increasing the opposite acting force of the first screw propeller 301 at the same rotation speed.

The first channel 301 may have different angles of inclination. According to one specific mode of implementation of the examples of the present application, the first channel 303 and a rotation plane of the first screw propeller 301 form a preset angle, and the preset angle ranges from 30 to 60 degrees. As an example, the preset angle is 45 degree.

Similar to the first channel 303 provided on the first propeller 3, a similar second channel also can be provided on the second propeller 4.

Figure 5:
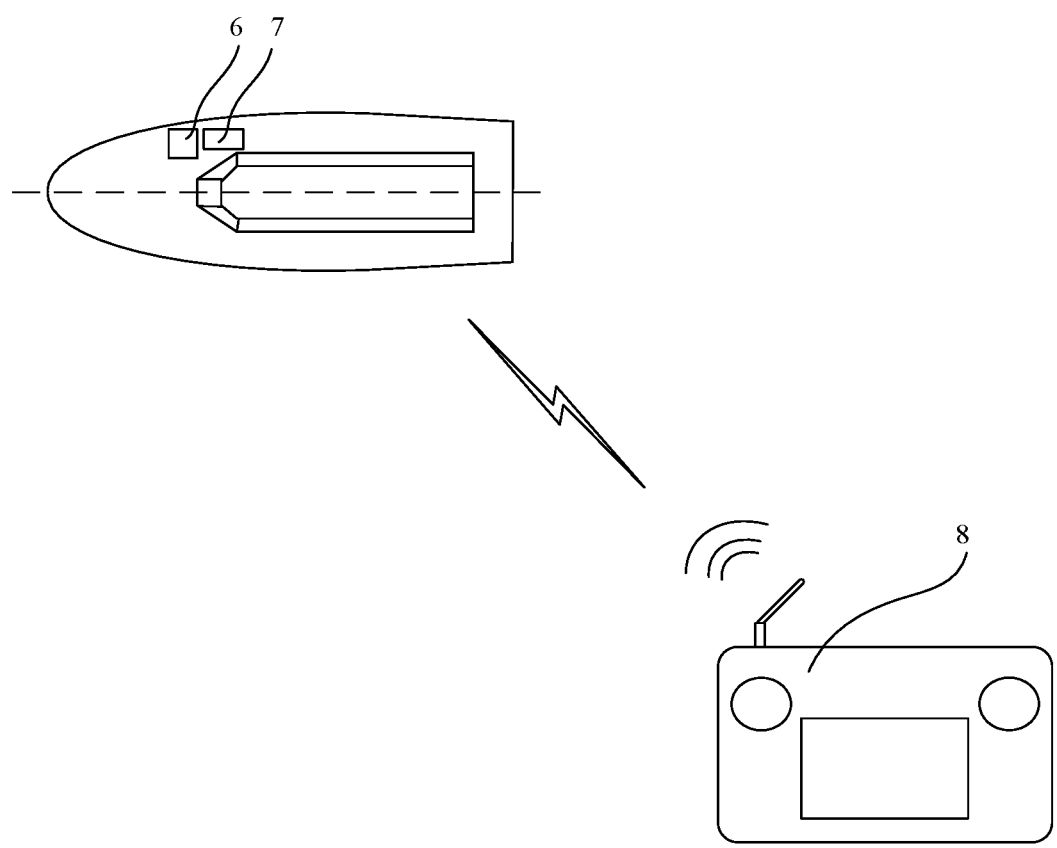
FIG. 5 is a schematic diagram of the communication between the unmanned vehicle and the controller provided by one embodiment of the present application.

The self-righting operation for a traditional unmanned vehicle is usually carried out by means of manual observation, which depends on the user in general and may often result in substantial delay and low efficiency. As shown in FIG. 5, according to one specific mode of implementation of the examples of the present application, the self-righting unmanned vehicle further comprises a sensing device 6, detecting whether the unmanned vehicle is in the overturned state. The sensing device 6 may be a gyroscope or a similar device capable of positioning the attitude and position of the unmanned vehicle. Once having detected that the unmanned vehicle is in the overturned state, the sensing device 6 can inform the control device 7 inside the unmanned vehicle of the information about overturned state of the unmanned vehicle.

Upon knowing that the unmanned vehicle is in the overturned state, the control device 7, on the one hand, can transmit the information to the unmanned vehicle controller 8 in a wireless or wired manner to remind a user of the unmanned vehicle by the unmanned vehicle controller 8, and prompt the user to perform a self-righting operation. On the other hand, according to the presetting conditions (e.g., the user allows the unmanned vehicle to perform the self-righting operation in the setting of the unmanned vehicle), the control device 7 also can decide by itself to allow the unmanned vehicle in the overturned state to perform the self-righting operation.

Once the control device 7 determines to perform the self-righting operation, the control device 7 controls the first screw propeller 301 to perform reverse rotation when the unmanned vehicle is in the overturned state.

In addition to that the sensing device 6 can judge whether the unmanned vehicle is in the overturned state according to the attitude of the unmanned vehicle, optionally, the sensing device 6 can be further configured to detect whether the second propeller 4 is above the water surface (above-water state). When the second propeller 4 is above the water surface, the control device 7 can control the second propeller 4 to stop rotating.

As another case, the control device 7 controls the second propeller 4 to stop rotating once the unmanned vehicle is in the overturned state, no matter whether or not the second propeller 4 is above the water surface.

As another case, when the second propeller 4 is in an underwater state and the unmanned vehicle is in the overturned state, the control device 7 controls the second propeller 4 to rotate in a forward direction. By the reverse rotation of the first propeller 3 and the forward rotation of the second propeller 4 can the speed of self-righting the unmanned vehicle be increased.

According to one specific mode of implementation of the examples of the present application, the control device 7 transmits to the unmanned vehicle controller the information about the overturning of the unmanned vehicle detected by the sensing device 6. In this way, the user can watch the self-righting process of the unmanned vehicle on the unmanned vehicle controller (e.g. a mobile phone).

In addition to the self-performance of the self-righting operation of the unmanned vehicle, according to one specific mode of implementation of the examples of the present application, the control device 7 receives propeller control instructions transmitted by the unmanned vehicle controller and controls, based on the control instructions, operation of the first propeller 3 and the second propeller 4.

In regard to the self-righting unmanned vehicle provided in the examples of the present application, the cavity 1 and the sealed cavity 2 are arranged at the both sides of the unmanned vehicle, respectively, such that water entering the cavity 1 can be used to enable the unmanned vehicle, when capsized, to be in an inclined state of sinking at the first side while rising upward at the second side; and the first propeller 3 provided at the tail intersection region of the normal waterline with the inversion waterline of the unmanned vehicle is used to perform a reverse rotation operation, such that the unmanned vehicle can quickly perform a self-righting operation.

The unmanned vehicle can be self-righted by the operation of the first propeller. The present application also provides a self-righting unmanned vehicle, the description of which will be made by reference to FIG. 1-FIG. 4.

As shown in FIG. 1, the self-righting unmanned vehicle comprises a hull and a first propeller 3. The first propeller 3 is provided in a tail intersection region of a normal waterline A with an inversion waterline B of the hull of the unmanned vehicle, and configured to rotate in a forward direction and then rotate in a reverse direction when the unmanned vehicle is in an overturned state. The inventor found that when the unmanned vehicle is capsized, controlling the first propeller 3 to first rotate in a forward direction and then in a reverse direction can help rapid self-righting of the unmanned vehicle in an unexpected way.

Those skilled in the art can understand that in the context of the present application, "the forward direction" refer to the rotational direction of the first propeller by which the unmanned vehicle can be propelled to advance, "the reverse direction" refer to the rotational direction of the first propeller opposite to the forward direction.

Furthermore, those features described above may also be combined with the cavity and sealed cavity to further facilitate the self-righting of the unmanned vehicle.

According to a preferred embodiment of the present application, the self-righting unmanned vehicle further comprises a cavity 1, located at a first side of the hull of the unmanned vehicle, and the first propeller 3 is located at the first side of the hull. The cavity 1 is an open space. When the unmanned vehicle is cruising normally, filled within the cavity is air, and when the unmanned vehicle is in an overturned state, the cavity will be below the water surface, and then water will gradually flow into the cavity 1. Because the cavity 1 is located at one side of the hull of the unmanned vehicle, and because water by then flows into the cavity 1 at the side of the cavity 1, the side provided with the cavity 1 of the unmanned vehicle will sink, while the other side opposite the cavity 1 will rise. The side of the unmanned vehicle provided with the first propeller sink, and the first propeller rotates in the forward direction and then in the reverse direction, the combination of the two factors will produce a torque to help the unmanned vehicle to self-right.

According to a preferred embodiment of the present application, the self-righting unmanned vehicle further comprises a sealed cavity 2, located at a second side of the hull of the unmanned vehicle, the cavity 1 and the sealed cavity 2 are both provided in a head region of the hull.

As shown in FIG. 1, the self-righting unmanned vehicle further comprises a second propeller 4, located at the second side of the hull and a buoyancy accessory 5, provided at the second side of the hull. As described above, the sealed cavity 2 is an airtight component. When the unmanned vehicle is in the overturned state, the sealed cavity will be below the water surface. Because the overall density of the sealed cavity 2 is lower than that of water, the sealed cavity 2 by then provides the unmanned vehicle with buoyancy at the second side, which further makes the first side of the unmanned vehicle remain in a sinking state and the second side of the unmanned vehicle in a rising state.

According to a preferred embodiment of the present application, the self-righting unmanned vehicle further comprises a sensing device 6 configured to detect whether the unmanned vehicle is in the overturned state and a control device 7, communicating with the sensing device and configured to control the first propeller to rotate in a forward direction for a predetermined time and then rotate in a reverse direction when the unmanned vehicle is in an overturned state, until the unmanned vehicle is turned over.

According to a preferred embodiment of the present application, the second propeller 4 is configured to stop rotating when the second propeller 4 is above the water surface. This may help avoid the waste of the energy of the unmanned vehicle and avoid the damage caused to the propeller motor by the prolonged idling of the second propeller 4.

The present application also provides a method for controlling an unmanned vehicle described above. The unmanned vehicle comprises a hull and a first propeller provided in a tail intersection region of a normal waterline with an inversion waterline of the hull of the unmanned vehicle. The method comprises: detecting whether the unmanned vehicle is in an overturned state; and controlling the first propeller to rotate in a forward direction and then rotate in a reverse direction when the unmanned vehicle is in an overturned state, until the unmanned vehicle is turned over.

The examples described above are not all, but some, of the examples of the present application. Based on the examples set forth in the present application, all other examples obtained by those skilled in the art without any creative labor should fall into the protection scope of the present application.

In the description of the present application, it should be noted that the relative orientation or position indicated by the terms "center", "top", "bottom", "left", "right", "vertical", "horizontal", "inside", "outside" and the like is based on the relative orientation or position shown in the drawings, which are used for the convenience of describing the present application and simplifying the description only, rather than indicating or implying that the devices or elements mentioned therein must have a particular orientation, or be constructed and operated in a particular orientation, and thus cannot be understood as limitations of the present application. In addition, the terms "first", "second" and "third" are used for description purposes only and cannot be understood as indication or implication of relative importance.

In the description of the present application, it should be noted that unless otherwise specified and defined, the terms "installation", "connection" and "association" should be understood in a broad sense, which, for example, can refer to fixed connection, detachable connection, or integrated connection; or can refer to mechanical connection, or electrical connection; or can refer to direct connection, or indirect connection through an intermediate medium, or internal communication between two elements. For those skilled in the art, the specific meaning of the above terms in the present application can be understood as the case may be.

Described above are merely the specific modes of implementation of the present application, but the protection scope of the present application is not limited to them. Any change or replacement that can be easily envisaged by any technical person familiar with the technical field within the technical scope disclosed in the present application should be covered in the protection scope of the present application. Therefore, the protection scope of the present application should be subject to the protection scope defined in the claims.

We claim:

1. A self-righting unmanned vehicle, comprising:
    a cavity, which is an open space located at a first side of a hull of the unmanned vehicle; wherein when the self-righting unmanned vehicle is in an overturned state, the cavity is below a water surface and then water flows into the cavity;
    a sealed cavity, located at a second side of the hull of the unmanned vehicle and provided in a head region of the hull; wherein a density of the sealed cavity is lower than a density of water, which provides the self-righting unmanned vehicle with buoyancy at the second side, and makes the self-righting unmanned vehicle in an inclined state of sinking at the first side while rising at the second side when the self-righting unmanned vehicle is in the overturned state; and
    a first propeller, provided in a tail intersection region of a normal waterline with an inversion waterline of the unmanned vehicle, and rotating in a reverse direction when the unmanned vehicle is in the overturned state.

2. The self-righting unmanned vehicle according to claim 1, wherein the first propeller is located at the first side of the hull.

3. The self-righting unmanned vehicle according to claim 2, further comprising:
    a second propeller, located at the second side of the hull; and
    a buoyancy accessory, provided at the second side of the hull.

4. The self-righting unmanned vehicle according to claim 3, wherein the first propeller comprises a first screw propeller and a first channel in cooperation with the first screw propeller.

5. The self-righting unmanned vehicle according to claim 4, wherein the first propeller further comprises a screw propeller shield, a tail end of the first channel being connected with the screw propeller shield.

6. The self-righting unmanned vehicle according to claim 4, wherein the first channel and a rotation plane of the first screw propeller form a preset angle.

7. The self-righting unmanned vehicle according to claim 6, wherein the preset angle ranges from 30 to 60 degrees.

8. The self-righting unmanned vehicle according to claim 4, further comprising:
    a sensing device, detecting whether the unmanned vehicle is in the overturned state; and
    a control device, controlling the first screw propeller to perform a reverse rotation when the unmanned vehicle is in the overturned state.

9. The self-righting unmanned vehicle according to claim 8, wherein the sensing device is further configured to detect whether the second propeller is above the water surface.

10. The self-righting unmanned vehicle according to claim 9, wherein the control device controls the second propeller to stop rotating when the second propeller is above the water surface.

11. The self-righting unmanned vehicle according to claim 3, wherein the second propeller stops rotating when the unmanned vehicle is in the overturned state.

12. The self-righting unmanned vehicle according to claim 8, wherein the control device transmits to an unmanned vehicle controller information about the overturning of the unmanned vehicle detected by the sensing device.

13. The self-righting unmanned vehicle according to claim 12, wherein the control device receives propeller control instructions transmitted by the unmanned vehicle controller and controls, based on the control instructions, operation of the first and second propellers.

14. A method for controlling an unmanned vehicle, the unmanned vehicle comprising a hull and a first propeller provided in a tail intersection region of a normal waterline with an inversion waterline of the hull of the unmanned vehicle, the hull comprising a cavity which is an open space located at a first side of the hull and a sealed cavity located at a second side of the hull; wherein when the self-righting unmanned vehicle is in an overturned state, the cavity is below a water surface and is filled by water; wherein a density of the sealed cavity is lower than a density of water; and the method comprising: detecting whether the unmanned vehicle is in an overturned state; providing the self-righting unmanned vehicle with buoyancy at the second side, making the self-righting unmanned vehicle in an inclined state of sinking at the first side while rising at the second side and controlling the first propeller to rotate in a forward direction and then rotate in a reverse direction when the unmanned vehicle is in an overturned state, until the unmanned vehicle is turned over.

* * * * *